US012729317B2

(12) United States Patent
Maruyama

(10) Patent No.: US 12,729,317 B2
(45) Date of Patent: Sep. 8, 2026

(54) TREATMENT LIQUID COMPOSITION AND INK SET

(71) Applicant: SEIKO EPSON CORPORATION, Tokyo (JP)

(72) Inventor: Hiroaki Maruyama, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 819 days.

(21) Appl. No.: 18/159,839

(22) Filed: Jan. 26, 2023

(65) Prior Publication Data

US 2023/0235191 A1 Jul. 27, 2023

(30) Foreign Application Priority Data

Jan. 27, 2022 (JP) ................................ 2022-010723

(51) Int. Cl.

| | |
|---|---|
| ***C09D 11/54*** | (2014.01) |
| ***C09D 11/037*** | (2014.01) |
| ***C09D 11/107*** | (2014.01) |
| ***C09D 11/322*** | (2014.01) |
| ***C09D 11/326*** | (2014.01) |
| ***C09D 11/328*** | (2014.01) |
| ***C09D 11/40*** | (2014.01) |
| ***D06P 1/52*** | (2006.01) |
| ***D06P 1/54*** | (2006.01) |
| ***D06P 5/30*** | (2006.01) |

(52) U.S. Cl.
CPC ............ *C09D 11/54* (2013.01); *C09D 11/037* (2013.01); *C09D 11/107* (2013.01); *C09D 11/322* (2013.01); *C09D 11/326* (2013.01); *C09D 11/328* (2013.01); *C09D 11/40* (2013.01); *D06P 1/525* (2013.01); *D06P 1/54* (2013.01); *D06P 5/30* (2013.01)

(58) Field of Classification Search
CPC ....... C09D 11/54; C09D 11/40; C09D 11/037; C09D 11/328; C09D 11/107; C09D 11/326; C09D 11/322; D06P 1/525; D06P 1/54; D06P 5/30
See application file for complete search history.

(56) References Cited

U.S. PATENT DOCUMENTS

| | | | | |
|---|---|---|---|---|
| 4,147,679 | A * | 4/1979 | Scriven ................ | C09D 175/04 442/104 |
| 2004/0028843 | A1 * | 2/2004 | Romano, Jr. .......... | B41M 5/502 428/32.3 |
| 2012/0306976 | A1 | 12/2012 | Kitagawa et al. | |
| 2017/0314194 | A1 * | 11/2017 | Arai ...................... | D06P 1/5257 |
| 2019/0284420 | A1 | 9/2019 | Sugiyama et al. | |

FOREIGN PATENT DOCUMENTS

| | | | | |
|---|---|---|---|---|
| JP | H09-302582 | A | | 11/1997 |
| JP | 2000-282376 | A | | 10/2000 |
| JP | 2006-124855 | A | | 5/2006 |
| JP | 2009215506 | A | * | 9/2009 |
| JP | 2012-251062 | A | | 12/2012 |
| JP | 2015-168896 | A | | 9/2015 |
| JP | 2019-157071 | A | | 9/2019 |
| JP | 2020-00220 | | * | 1/2020 |

OTHER PUBLICATIONS

Machine English translation of JP 2009-215506, Ogawa et al., Sep. 24, 2009.*
Machine English translation of JP 2020-002220, Omoto et al., Jan. 9, 2020.*

* cited by examiner

*Primary Examiner* — Patrick D Niland
(74) *Attorney, Agent, or Firm* — Harness, Dickey & Pierce, P.L.C.

(57) ABSTRACT

A treatment liquid composition which is applied to an area of a cloth in which a colorant-containing ink composition is printed contains cationic acrylic-based resin particles and resin particles having a cross-linkable group.

8 Claims, No Drawings

TREATMENT LIQUID COMPOSITION AND INK SET

The present application is based on, and claims priority from JP Application Serial Number 2022-010723, filed Jan. 27, 2022, the disclosure of which is hereby incorporated by reference herein in its entirety.

BACKGROUND

1. Technical Field

The present disclosure relates to a treatment liquid composition and an ink set.

2. Related Art

An ink jet recording method is able to record a highly fine image by a relatively simple apparatus and has been rapidly developed in various fields. Among the developments, various studies have been carried out on a textile printing method. For example, in order to provide an ink jet printing method excellent in deep coloration performance, economic efficiency, transportability (no yarn slippage), aptitude for overprinting, and light resistance, JP-A-2006-124855 has disclosed in the textile printing, a deep color processing method in which a deep color processing liquid containing a resin which is able to form a film having a low refractive index as compared to that of a cloth surface is applied to an image recorded on the cloth by an ink containing a colorant.

However, the film formed by the deep color processing liquid described in JP-A-2006-124855 disadvantageously has an inferior friction fastness.

SUMMARY

According to an aspect of the present disclosure, there is provided a treatment liquid composition which is applied to an area of a cloth in which a colorant-containing ink composition is printed and which comprises cationic acrylic-based resin particles and resin particles having a cross-linkable group.

According to another aspect of the present disclosure, there is provided an ink set comprising the treatment liquid composition described above and a colorant-containing ink composition.

DESCRIPTION OF EXEMPLARY EMBODIMENTS

Hereinafter, although an embodiment (hereinafter, referred to as "this embodiment") of the present disclosure will be described in detail, the present disclosure is not limited thereto and may be variously changed and/or modified without departing from the scope thereof.

In this specification, "(meth)acryl" indicates acryl or methacryl corresponding thereto.

1. Treatment Liquid Composition

A treatment liquid composition of this embodiment is a treatment liquid composition which is applied to an area of a cloth in which a colorant-containing ink composition is printed and which contains cationic acrylic-based resin particles and resin particles having a cross-linkable group.

A recorded matter obtained by an ink jet textile printing is liable to have an inferior color development property as compared to that of a recorded matter obtained by an analogue textile printing, and hence, a method to adhere an overcoat liquid has been studied. Since the overcoat liquid is adhered, regular reflection of light at a cloth surface is reduced, and irregular reflection occurs, so that the color development property of deep color can be further improved. However, the overcoat liquid as described above disadvantageously has an inferior friction fastness.

In contrast to the case described above, in this embodiment, since the cationic acrylic-based resin particles and the resin particles having a cross-linkable group are used in combination, when the treatment liquid composition is adhered to an area of a cloth in which a colorant-containing ink composition is printed, the color development property, in particular, a black color density, is improved, and in addition, the friction fastness can also be improved. Hereinafter, components contained in the treatment liquid composition will be described.

1.1. Cationic Acrylic-Based Resin Particles

The cationic acrylic-based resin particles are not particularly limited as long as being (meth)acrylic-based resin particles having a cationic functional group. Although a resin forming the resin particles as described above is not particularly limited, for example, there may be mentioned a resin obtained by polymerization of a (meth)acrylic-based monomer, a resin obtained by copolymerization between a (meth)acrylic-based monomer and a styrene monomer, such as styrene or α-methylstyrene, or a resin obtained by copolymerization between a (meth)acrylic-based monomer and a vinyl monomer.

Although the cationic functional group is not particularly limited, for example, an amino group, a quaternary ammonium cationic group, an amide group, or a nitrogen-containing heterocyclic group may be mentioned. In addition, as the nitrogen-containing heterocyclic group, for example, a pyridine ring group, a pyrazine ring group, a pyridazine ring group, a pyrimidine ring group, or a triazine ring group may be mentioned.

The cationic acrylic-based resin particles may be formed from at least one of the materials mentioned above using a cationic surfactant as an emulsion stabilizer. As the cationic surfactant, for example, there may be mentioned a laurylamine salt, a stearyltrimethylenediamine salt, an octadecylamine salt, lauryl pyridinium chloride, stearyl ammonium chloride, dioleyl ammonium chloride, or octylbenzyltrimethylammonium chloride.

Furthermore, the cationic acrylic-based resin particles may be formed such that after emulsion polymerization is performed using at least one of the materials mentioned above with a nonionic surfactant, for example, a cationic substance, such as a cationic surfactant, a polyoxyethylene alkylamine, and/or a polyethylene imine, may be added.

Although not particularly limited, for example, the cationic acrylic-based resin particles as described above may be formed, for example, such that an N-substituted aminoalkyl (meth)acrylate, such as dimethylaminoethyl (meth)acrylate or diethylaminoethyl (meth)acrylate, or an N-substituted aminoalkyl (meth)acrylamide, such as dimethylaminopropyl (meth)acrylamide, is radical-copolymerized with another (meth)acrylic monomer, styrene, α-methylstyrene, and/or the like and is then quaternized by an alkylating agent.

An average particle diameter of the cationic acrylic-based resin particles is preferably 50 to 300 nm, more preferably 60 to 250 nm, and further preferably 70 to 200 nm. Since the average particle diameter is in the range described above, the color development property tends to be further improved. In this embodiment, the average particle diameter is the median diameter.

A content of the cationic acrylic-based resin particles with respect to a total mass of the treatment liquid composition is preferably 0.01 to 3.0 percent by mass, more preferably 0.01 to 2.0 percent by mass, and further preferably 0.01 to 1.0 percent by mass. Since the content of the cationic acrylic-based resin particles is 0.01 percent by mass or more, a coating film to be obtained is more likely to cause irregular reflection, and the color development property, in particular, the color development property of deep color, tends to be further improved. Since the content of the cationic acrylic-based resin particles is 3.0 percent by mass or less, the friction fastness of a coating film to be obtained tends to be further improved.

A mass ratio of the content of the cationic acrylic-based resin particles to a content of the resin particles having a cross-linkable group is preferably 1.0 to 30, more preferably 2.0 to 25, and further preferably 3.0 to 20. Since the mass ratio of the content of the cationic acrylic-based resin particles to the content of the resin particles having a cross-linkable group is 1.0 or more, the color development property and texture tend to be further improved, and yellowing tends to be more unlikely to be generated. In addition, since the mass ratio of the content of the cationic acrylic-based resin particles to the content of the resin particles having a cross-linkable group is 30 or less, the friction fastness tends to be further improved.

1.2. Resin Particles Having Cross-Linkable Group

The cross-linkable group may be one of cross-linkable groups to form a cross-linked structure by a reaction therebetween or may be a cross-linkable group to form a cross-linked structure by a reaction with a functional group different therefrom. Since resin particles having the cross-linkable group as described above are used, the friction fastness of a coating film to be obtained tends to be further improved.

A content of the resin particles having a cross-linkable group with respect to the total mass of the treatment liquid composition is preferably 0.01 to 0.50 percent by mass, more preferably 0.01 to 0.30 percent by mass, and further preferably 0.02 to 0.20 percent by mass. Since the content of the resin particles having a cross-linkable group is 0.01 percent by mass or more, the friction fastness tends to be further improved. Since the content of the resin particles having a cross-linkable group is 0.50 percent by mass or less, the color development property and the texture are further improved, and the yellowing tends to be more unlikely to be generated.

Although the cross-linkable group as described above is not particularly limited, for example, an isocyanate-based cross-linkable group, an oxazoline-based cross-linkable group, or a carbodiimide-based cross-linkable group may be mentioned. Since the cross-linkable group as described above is included, the friction fastness and the color development property are further improved, and the yellowing tends to be more unlikely to be generated.

As an isocyanate-based cross-linking agent, for example, there may be mentioned an aromatic polyisocyanate, an alicyclic polyisocyanate, an aliphatic polyisocyanate, adducts thereof with various types of polyols, and polyisocyanates polyfunctionalized, for example, by an isocyanurate bond, a biuret bond, and/or an allophanate bond.

In more particular, for example, there may be used at least one selected from the group consisting of lower aliphatic polyisocyanates, such as butylene diisocyanate and hexamethylene diisocyanate; alicyclic polyisocyanates, such as cyclopentylene diisocyanate, cyclohexylene diisocyanate, isophorone diisocyanate, hydrogenated tolylene diisocyanate, and 1,3-bis(isocyanatomethyl)cyclohexane; aromatic polyisocyanates, such as 2,4-tolylene diisocyanate, 2,6-tolylene diisocyanate, diphenylmethane-4,4'-diisocyanate, 1,3-xylylene diisocyanate, 1,4-xylylene diisocyanate, tetramethylxylylene diisocyanate, 1,5-naphthalene diisocyanate, triphenylmethane triisocyanate, and a polymethylene polyphenyl isocyanate; isocyanate adducts, such as a trimethylolpropane/tolylene diisocyanate trimer adduct, a trimethylolpropane/hexamethylene diisocyanate trimer adduct, and an isocyanurate of hexamethylene diisocyanate; a trimethylolpropane adduct of xylylene diisocyanate; a trimethylolpropane adduct of hexamethylene diisocyanate; a polyether polyisocyanate, a polyester polyisocyanate, and adducts thereof with various types of polyols; and polyisocyanates polyfunctionalized, for example, by an isocyanurate bond, a biuret bond, and/or an allophanate bond. Among those mentioned above, an aliphatic polyisocyanate is preferably used, and an isocyanurate of an aliphatic diisocyanate (such as an isocyanurate of hexamethylene diisocyanate) is more preferable.

The isocyanate-based cross-linking agent described above may be a blocked isocyanate. The blocked isocyanate is an isocyanate in which an isocyanate group is blocked by a blocking agent. The blocking agent inactivates an isocyanate group by blocking thereof and also regenerates or activates an isocyanate after deblocking thereof. As the blocking agent, for example, there may be mentioned an imidazole-based compound, an imidazoline-based compound, a pyrimidine-based compound, a guanidine-based compound, an alcohol-based compound, a phenol-based compound, an activated methylene-based compound, an amine-based compound, an imine-based compound, an oxime-based compound, a carbamic acid-based compound, an urea-based compound, an acid amide-based (lactam-based) compound, an acid imide-based compound, a triazole-based compound, a pyrazole-based compound, a mercaptan-based compound, or a bisulfite salt. Since the resin has a cross-linkable group, a cross-linked structure is formed between the resin particles, and hence, the friction fastness can be made preferable.

As the blocking agent, in more particular, for example, there may be mentioned a phenol-based blocking agent, such as phenol, cresol, or xylenol; a lactam-based blocking agent, such as ε-caprolactam, δ-valerolactam, or γ-butyrolactam; an alcohol-based blocking agent, such as methanol, ethanol, n-, i-, or t-butyl alcohol, ethylene glycol monomethyl ether, ethylene glycol monobutyl ether, diethylene glycol monoethyl ether, propylene glycol monomethyl ether, or benzyl alcohol; an oxime-based blocking agent, such as formamidoxime, acetaldoxime, acetoxime, methyl ethyl ketoxime, diacetyl monoxime, benzophenone oxime, butanone oxime, or cyclohexanone oxime; an activated methylene-based blocking agent, such as dimethyl malonate, diethyl malonate, ethyl acetoacetate, or acetylacetone; a pyrazole-based blocking agent, such as dimethyl pyrazole, 3-methylpyrazole, 3,5-dimethylpyrazole, or 3,5-di-tert-butylpyrazole; an imidazole-based blocking agent, such as 2-methylimidazole, 2-ethylimidazole, 2-isopropylimidazole, 2-ethyl-4-methylimidazole, 2-undecylimidazole, benzimidazole, or 5-methylbenzimidazole; or a triazole-based blocking agent, such as 1,2,4-tirazole, 3-methyl-1,2,4-triazole, 3-ethyl-1,2,4-triazole, or 1,2,3-benztriazole.

Among those mentioned above, a pyrazole-based blocking agent or an oxime-based blocking agent is preferable, a pyrazole-based blocking agent is more preferable, and a dimethylpyrazole blocking agent is further preferable. Accordingly, the friction fastness and the color development property are further improved, and the yellowing tends to be more unlikely to be generated. In particular, since a dimethylpyrazole blocking agent can be dissociated at a low temperature, the friction fastness of a recorded matter to be obtained is improved, the yellowing is suppressed, and the toxicity tends to be reduced. In addition, compared to another blocking agent having a low dissociation temperature, the storage stability is also excellent.

Although the resin particles having an oxazoline-based cross-linkable group is not particularly limited, for example, there may be mentioned a polymer having an oxazoline group obtained by copolymerization using a known method (such as solution polymerization or emulsion polymerization) between a polymerizable unsaturated monomer having an oxazoline group and, if needed, another polymerizable unsaturated monomer.

Although the polymerizable unsaturated monomer having an oxazoline group is not particularly limited, for example, there may be mentioned 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline, or 2-isopropenyl-5-ethyl-2-oxazoline.

Although the resin particles having a carbodiimide-based cross-linkable group is not particularly limited, for example, a polycarbodiimide obtained by a condensation reaction of diisocyanates to release carbon dioxide may be mentioned.

As a diisocyanate used as a raw material of a polycarbodiimide compound, for example, there may be mentioned an aromatic diisocyanate, such as an isomer of tolylene diisocyanate or 4,4-diphenylmethane diisocyanate; an aromatic aliphatic diisocyanate, such as xylylene diisocyanate; an alicyclic diisocyanate, such as isophorone diisocyanate, 4,4-dicyclohexylmethane diisocyanate, or 1,3-bis(isocyanate methyl)cyclohexane; or an aliphatic diisocyanate, such as hexamethylene diisocyanate or 2,2,4-trimethylhexamethylene diisocyanate.

In addition, the diisocyanate described above may be used such that the molecule is controlled to have an appropriate polymerization degree using a compound, such as a monoisocyanate, which reacts with a terminal isocyanate. As the monoisocyanate to control the polymerization degree by sealing the terminal of the polycarbodiimide, for example, there may be mentioned phenyl isocyanate, tolylene isocyanate, dimethylphenyl isocyanate, cyclohexyl isocyanate, butyl isocyanate, or naphthyl isocyanate. In addition, as the terminal sealing agent, for example, a compound having an —OH group, an —$NH_2$ group, a —COOH group, or an —$SO_3H$ group may be used.

The condensation reaction of diisocyanates to release carbon dioxide proceeds under the presence of a carbodiimidizing catalyst. As the catalyst, for example, there may be mentioned a phospholene oxide, such as 1-phenyl-2-phospholene-1-oxide, 3-methyl-2-phospholene-1-oxide, 1-ethyl-2-phospholene-1-oxide, 3-methyl-1-phenyl-2-phospholene-1-oxide, or a 3-phospholene isomer of one of those mentioned above, and in view of reactivity, 3-methyl-1-phenyl-2-phospholene-1-oxide is preferable. In addition, a use amount of the catalyst described above is regarded as a catalyst amount.

1.3. Water

A content of the water with respect to the total mass of the treatment liquid composition is preferably 90 to 99.7 percent by mass, more preferably 92.5 to 99.5 percent by mass, and further preferably 95 to 99 percent by mass.

1.4. Surfactant

The treatment liquid composition used in this embodiment preferably contains a surfactant. Although the surfactant is not particularly limited, for example, at least one selected from the group consisting of an acetylene glycol-based surfactant, a fluorine-based surfactant, and a silicone-based surfactant is preferable.

Although the acetylene glycol-based surfactant is not particularly limited, for example, at least one selected from the group consisting of 2,4,7,9-tetramethyl-5-decyne-4,7-diol, an alkylene oxide adduct thereof, 2,4-dimethyl-5-decyne-4-ol, and an alkylene oxide adduct thereof is preferable.

Although the fluorine-based surfactant is not particularly limited, for example, there may be mentioned a perfluoroalkyl sulfonate salt, a perfluoroalkyl carboxylate salt, a perfluoroalkyl phosphate ester, a perfluoroalkyl ethylene oxide adduct, a perfluoroalkyl betaine, or a perfluoroalkylamine oxide compound.

As the silicone-based surfactant, for example, a polysiloxane-based compound or a polyether modified organosiloxane may be mentioned.

Among those mentioned above, a nonionic surfactant is preferable. As the nonionic surfactant, for example, a silicone-based surfactant, a polyoxyethylene alkyl ether-based surfactant, a polyoxypropylene alkyl ether-based surfactant, a polycyclic phenyl ether-based surfactant, a sorbitan derivative, or a fluorine-based surfactant may be mentioned.

A content of the surfactant with respect to the total mass of the treatment liquid composition is preferably 0.1 to 1.0 percent by mass, more preferably 0.2 to 0.7 percent by mass, and further preferably 0.3 to 0.5 percent by mass.

1.5. Other Components

The treatment liquid composition may further contain, if needed, other components, such as a water-soluble organic solvent.

2. Ink Set

An ink set of this embodiment includes the treatment liquid composition described above and a colorant-containing ink composition. The colorant-containing ink composition may be either a pigment ink or a dye ink.

2.1. Colorant-Containing Ink Composition

Although components contained in the colorant-containing ink composition are not particularly limited, for example, a colorant, water, a water-soluble organic solvent, a fixing resin, resin particles having a cross-linkable group, and a surfactant may be contained.

2.1.1. Colorant

As the colorant, a dye or a pigment may be mentioned. Hereinafter, although the dye and the pigment will be described by way of example, the colorant of this embodiment is not limited thereto.

An inorganic pigment is not particularly limited, and for example, there may be mentioned a carbon black (C.I. Pigment Black 7), such as furnace black, lamp black, acetylene black, or channel black, iron oxide, or titanium oxide.

Although an organic pigment is not particularly limited, for example, there may be mentioned a quinacridone-based pigment, a quinacridone quinone-based pigment, a dioxazine-based pigment, a phthalocyanine-based pigment, an anthrapyrimidine-based pigment, an anthanthrone-based pigment, an indanthrone-based pigment, a flavanthrone-based pigment, a perylene-based pigment, a diketopyrrolopyrrole-based pigment, a perinone-based pigment, a quinophthalone-based pigment, an anthraquinone-based pigment, a thioindigo-based pigment, a benzimidazolone-based pigment, an isoindolinone-based pigment, an azomethine-based pigment, or an azo-based pigment.

The pigment described above may be a pigment dispersion liquid obtained by dispersing a pigment in water by a dispersant or may be a self-dispersible type surface-treated pigment in which a hydrophilic group is incorporated on pigment particle surfaces using a chemical reaction.

Although the dye is not particularly limited, for example, there may be mentioned an acid dye, such as C.I. Acid Yellow, C.I. Acid Red, C.I. Acid Blue, C.I. Acid Orange, C.I. Acid Violet, or C.I. Acid Black; a basic dye, such as C.I. Basic Yellow, C.I. Basic Red, C.I. Basic Blue, C.I. Basic Orange, C.I. Basic Violet, or C.I. Basic Black; a direct dye, such as C.I. Direct Yellow, C.I. Direct Red, C.I. Direct Blue, C.I. Direct Orange, C.I. Direct Violet, or C.I. Direct Black; a reactive dye, such as C.I. Reactive Yellow, C.I. Reactive Red, C.I. Reactive Blue, C.I. Reactive Orange, C.I. Reactive Violet, or C.I. Reactive Black; or a disperse dye, such as C.I. Disperse Yellow, C.I. Disperse Red, C.I. Disperse Blue, C.I. Disperse Orange, C.I. Disperse Violet, or C.I. Disperse Black.

A content of the colorant with respect to a total mass of the ink composition is, as a solid content, preferably 1.0 to 12 percent by mass, more preferably 2.0 to 10 percent by mass, and further preferably 3.0 to 7.5 percent by mass.

2.1.2. Water

A content of the water with respect to the total mass of the ink composition is preferably 50 to 95 percent by mass, more preferably 60 to 90 percent by mass, and further preferably 65 to 85 percent by mass.

2.1.3. Water-Soluble Organic Solvent

Although the water-soluble organic solvent is not particularly limited, for example, there may be mentioned a polyol, a glycol ether-based organic solvent, a cyclic amide, an acyclic amide, an acyclic ester, or a cyclic ester. Among those mentioned above, a nitrogen-containing organic solvent, a glycol ether-based organic solvent, or a polyol is preferable. The water-soluble organic solvent may be used alone, or at least two types thereof may be used in combination.

The polyol is not particularly limited, and for example, there may be mentioned ethylene glycol, propylene glycol, 1,2-propanediol, 1,2-butanediol, 1,3-propanediol, 1,4-butanediol, diethylene glycol, triethylene glycol, dipropylene glycol, trimethylolpropane, glycerin, 1,2-pentanediol, 1,2-hexanediol, 1,2-octanediol, 1,6-hexanediol, 2-methyl-2,4-pentanediol, 2-ethyl-2-methyl-1,3-propanediol, 2-methyl-2-propyl-1,3-propanediol, 2-methyl-1,3-propanediol, 2,2-dimethyl-1,3-propanediol, 3-methyl-1,3-butanediol, 2-ethyl-1,3-hexanediol, 3-methyl-1,5-pentanediol, or 2-methylpentane-2,4-diol.

The glycol ether-based solvent is not particularly limited, and for example, there may be mentioned ethylene glycol monomethyl ether, ethylene glycol monoethyl ether, ethylene glycol monopropyl ether, ethylene glycol monobutyl ether, ethylene glycol monomethyl ether acetate, diethylene glycol monomethyl ether, diethylene glycol monoethyl ether, diethylene glycol monopropyl ether, diethylene glycol monobutyl ether, diethylene glycol mono-t-butyl ether, triethylene glycol monobutyl ether, 1-methyl-1-methoxybutanol, propylene glycol monomethyl ether, propylene glycol monoethyl ether, propylene glycol monopropyl ether, propylene glycol monobutyl ether, dipropylene glycol monomethyl ether, dipropylene glycol monoethyl ether, dipropylene glycol monopropyl ether, dipropylene glycol monobutyl ether, 3-metoxy-3-methyl-1-butanol, ethylene glycol dimethyl ether, ethylene glycol diethyl ether, ethylene glycol dibutyl ether, diethylene glycol dimethyl ether, or diethylene glycol diethyl ether.

A content of the water-soluble organic solvent with respect to the total mass of the ink composition is preferably 1 to 40 percent by mass, more preferably 2 to 30 percent by mass, and further preferably 5 to 20 percent by mass.

2.1.4. Fixing Resin

The fixing resin is not particularly limited, and for example, there may be mentioned an urethane-based resin, an acrylic-based resin, a fluorene-based resin, a polyolefin-based resin, a rosin-modified resin, a terpene-based resin, a polyester-based resin, a polyamide-based resin, an epoxy-based resin, a vinyl chloride-based resin, or an ethylene-vinyl acetate-based resin. The fixing resin may be used alone, or at least two types thereof may be used in combination.

At least part of the fixing resin is the same as the resin particles having a cross-linkable group which are described in the treatment liquid composition by way of example, and the cross-linkable group of the resin particles contained in the colorant-containing ink composition and the cross-linkable group of the resin particles contained in the treatment liquid composition both may have properties so as to be cross-linked with each other. For example, when the resin particles contained in the treatment liquid composition have the same cross-linkable group, such as an isocyanate group, as the cross-linkable group of the fixing resin contained in the ink composition, the cross-linkable groups thereof have properties so as to be cross-linked with each other. Accordingly, the friction fastness of a recorded matter to be obtained tends to be further improved.

A content of the fixing resin with respect to the total mass of the ink composition is, as a solid content, preferably 1.0 to 15 percent by mass, more preferably 3.0 to 12 percent by mass, and further preferably 5.0 to 10 percent by mass.

2.1.4. Surfactant

The surfactant is not particularly limited, and for example, an acetylene alcohol-based surfactant, a fluorine-based surfactant, or a silicone-based surfactant may be mentioned. In more particular, a surfactant similar to that described in the treatment liquid composition by way of example may be mentioned.

A content of the surfactant with respect to the total mass of the ink composition is preferably 0.1 to 3.0 percent by mass and more preferably 0.5 to 2.0 percent by mass.

3. Printing Method

A printing method of this embodiment includes a recording step of adhering an ink composition containing a dye to a surface of a cloth by an ink jet method and, after the recording step described above, a treatment liquid adhesion step of adhering the treatment liquid composition described above to an area of the cloth to which the ink composition is adhered and may also include, if needed, a heating step and/or a washing step.

3.1. Recording Step

The recording step is a step of adhering an ink composition containing a dye to a surface of a cloth by an ink jet method. The ink jet method is not particularly limited, and for example, a charge deflection method, a continuous method, or an on-demand method (a piezoelectric method or a bubble jet (registered trademark) method)) may be mentioned.

3.2. Treatment Liquid Adhesion Step

The treatment liquid adhesion step is performed after the recording step and is a step of adhering the treatment liquid composition described above to the area of the cloth to which the ink composition is adhered. A method to adhere the treatment liquid composition is not particularly limited, and for example, a roller method, a spray method, or an ink jet method may be mentioned. Among the methods mentioned above, since the treatment liquid composition can be selectively adhered, an ink jet method is preferable. In the treatment liquid adhesion step, before or after the ink composition adhered to the cloth is dried, the treatment liquid composition may be adhered thereto.

3.3. Heating Step

The ink jet printing method may further includes, after the recording step and the treatment liquid adhesion step, a heating step of heating the cloth. Since the heating step is included, a dye can be preferably dyed on fibers forming the cloth. A heating method is not particularly limited, and for example, an HT method (high-temperature steaming method), an HP method (high-pressure steaming method), or a thermosol method may be mentioned.

In addition, in the heating step, a surface of the cloth to which the ink composition is adhered may be or may be not processed by a pressure treatment. As a heating method in which the surface of the cloth to which the ink composition is adhered is not processed by a pressure treatment, an oven drying method (method which uses a conveyor oven, a batch oven, or the like and which includes no press operation) may be mentioned. By the heating step as described above, the productivity of recorded matters can be further improved. In addition, a heating method in which the surface of the cloth to which the ink composition is adhered is also processed by a pressure treatment is not particularly limited, and for example, heat press or wet on dry may be mentioned. In addition, the "pressure" treatment indicates a treatment in which a solid matter is brought into contact with the cloth so that a pressure is applied thereto.

A temperature in the heating treatment is preferably 80° C. to 150° C. and more preferably 90° C. to 110° C. Since the temperature in the heating treatment is in the range described above, the dye tends to be more preferably dyed on the fibers forming the cloth.

3.4. Washing Step

The ink jet printing method may further include, after the heating step, a washing step of washing the cloth. By the washing step, a dye which is not dyed on the fibers can be effectively removed. The washing step can be performed, for example, with water, and if needed, a soaping treatment may also be performed. A soaping treatment method is not particularly limited, and for example, a method in which an unfixed pigment is removed with a hot soap liquid may be mentioned.

3.5. Cloth

Although the fibers forming the cloth are not particularly limited, for example, natural fibers, such as silk, cotton, hemp, or wool; synthetic fibers, such as polyester fibers, nylon fibers, triacetate fibers, diacetate fibers, or polyamide fibers; or regenerated fibers such as a rayon, may be mentioned. As the cloth, one type of fibers or blended fibers formed from at least two types of fibers may be used. As the cloth, a woven cloth, a knitted cloth, or a non-woven cloth, each of which is formed from the fibers mentioned above, may be used.

EXAMPLES

Hereinafter, the present disclosure will be described in more detail with reference to Examples and Comparative Examples. The present disclosure is not at all limited to the following examples.

1. Ink Composition

The following materials were mixed together and then sufficiently stirred, so that each ink composition was obtained. In addition, a polyurethane resin used for a pigment ink was Takelac WS6021 (trade name, manufactured by Mitsui Chemicals, Inc.) and had an isocyanate-based cross-linkable group as a cross-linkable group.

1.1. Pigment Ink

| | |
|---|---|
| Pigment: self-dispersible carbon black pigment (solid content: 15%) | 30.0 percent by mass |
| Fixing resin: polyurethane resin (solid content: 30%) | 20.0 percent by mass |
| Organic solvent: glycerin | 10.0 percent by mass |
| Organic solvent: triethylene glycol | 5.0 percent by mass |
| Surfactant: Olfine E1010 (manufactured by Nisshin Chemical Industry Co., Ltd.) | 1.0 percent by mass |
| Water: | balance |

1.2. Dye Ink

| | |
|---|---|
| Dye: Reactive Black 39 (solid content: 20%) | 10.0 percent by mass |
| Organic solvent: propylene glycol | 10.0 percent by mass |
| Surfactant: Olfine PD002W (manufactured by Nisshin Chemical Industry Co., Ltd.) | 0.5 percent by mass |
| Water: | balance |

2. Treatment Liquid Composition

The materials of each example shown in Tables 1 and 2 were mixed together and then sufficiently stirred, so that each treatment liquid composition was obtained. In Table 1, evaluation results each obtained using the treatment liquid composition and the pigment ink are shown, and in Table 2, evaluation results each obtained using the treatment liquid composition and the dye ink are shown.

TABLE 1

| | | EXAMPLE | | | | | | |
|---|---|---|---|---|---|---|---|---|
| | | 1 | 2 | 3 | 4 | 5 | 6 | 7 |
| CATIONIC RESIN PARTICLES | LUSTER AB-8K | 0.5 | 0.5 | 0.5 | 0.5 | 0.5 | 0.5 | 0.5 |
| CROSS-LINKABLE RESIN PARTICLES | PHOBOL EXTENDER XAN | 0.025 | 0.05 | 0.1 | 0.2 | 0.3 | | |
| | PHOBOL EXTENDER UXN | | | | | | 0.025 | 0.05 |
| | POLYURETHANE RESIN | | | | | | | |

TABLE 1-continued

| | | | | | | | | |
|---|---|---|---|---|---|---|---|---|
| SURFACTANT | | 0.4 | 0.4 | 0.4 | 0.4 | 0.4 | 0.4 | 0.4 |
| WATER | | BALANCE | BALANCE | BALANCE | BALANCE | BALANCE | BALANCE | BALANCE |
| CATIONIC RESIN PARTICLES/CROSS-LINKABLE RESIN PARTICLES | | 20 | 10 | 5 | 2.5 | 1.67 | 20 | 10 |
| EVALUATION | COLOR DEVELOPMENT PROPERTY | A | B | C | C | C | A | B |
| | DRY FRICTION FASTNESS | B | B | A | A | A | A | A |
| | WET FRICTION FASTNESS | B | B | A | A | A | A | A |
| | TEXTURE | A | A | B | B | B | A | A |
| | YELLOWING | B | B | B | C | C | A | A |

| | | EXAMPLE | | | COMPARATIVE EXAMPLE | | |
|---|---|---|---|---|---|---|---|
| | | 8 | 9 | 10 | 1 | 2 | 3 |
| CATIONIC RESIN PARTICLES | LUSTER AB-8K | 0.5 | 0.5 | 0.5 | 0.5 | | |
| CROSS-LINKABLE RESIN PARTICLES | PHOBOL EXTENDER XAN | | | | | | |
| | PHOBOL EXTENDER UXN | 0.1 | 0.2 | 0.3 | | 0.3 | 0.025 |
| | POLYURETHANE RESIN | | | | | | 0.5 |
| SURFACTANT | | 0.4 | 0.4 | 0.4 | 0.4 | 0.4 | 0.4 |
| WATER | | BALANCE | BALANCE | BALANCE | BALANCE | BALANCE | BALANCE |
| CATIONIC RESIN PARTICLES/CROSS-LINKABLE RESIN PARTICLES | | 5 | 2.5 | 1.67 | — | — | — |
| EVALUATION | COLOR DEVELOPMENT PROPERTY | C | C | C | A | D | D |
| | DRY FRICTION FASTNESS | A | A | A | C | A | A |
| | WET FRICTION FASTNESS | A | A | A | C | A | A |
| | TEXTURE | B | B | B | A | B | C |
| | YELLOWING | A | A | A | A | A | B |

TABLE 2

| | | EXAMPLE | | | | | | |
|---|---|---|---|---|---|---|---|---|
| | | 11 | 12 | 13 | 14 | 15 | 16 | 17 |
| CATIONIC RESIN PARTICLES | LUSTER AB-8K | 0.5 | 0.5 | 0.5 | 0.5 | 0.5 | 0.5 | 0.5 |
| CROSS-LINKABLE RESIN PARTICLES | PHOBOL EXTENDER XAN | 0.025 | 0.05 | 0.1 | 0.2 | 0.3 | | |
| | PHOBOL EXTENDER UXN | | | | | | 0.025 | 0.05 |
| | POLYURETHANE RESIN | | | | | | | |
| SURFACTANT | | 0.4 | 0.4 | 0.4 | 0.4 | 0.4 | 0.4 | 0.4 |
| WATER | | BALANCE | BALANCE | BALANCE | BALANCE | BALANCE | BALANCE | BALANCE |
| CATIONIC RESIN PARTICLES/CROSS-LINKABLE RESIN PARTICLES | | 20 | 10 | 5 | 2.5 | 1.67 | 20 | 10 |
| EVALUATION | COLOR DEVELOPMENT PROPERTY | A | B | C | C | C | A | B |
| | CRY FRICTION FASTNESS | B | B | A | A | A | A | A |
| | WET FRICTION FASTNESS | B | B | A | | A | A | A |
| | TEXTURE | A | A | B | B | B | A | A |
| | YELLOWING | B | B | B | C | C | A | A |

TABLE 2-continued

| | | EXAMPLE | | | COMPARATIVE EXAMPLE | | |
|---|---|---|---|---|---|---|---|
| | | 18 | 19 | 20 | 4 | 5 | 6 |
| CATIONIC RESIN PARTICLES | LUSTER AB-8K | 0.5 | 0.5 | 0.5 | 0.5 | | |
| CROSS-LINKABLE RESIN PARTICLES | PHOBOL EXTENDER XAN | | | | | | |
| | PHOBOL EXTENDER UXN | 0.1 | 0.2 | 0.3 | | 0.3 | 0.025 |
| | POLYURETHANE RESIN | | | | | | 0.5 |
| SURFACTANT | | 0.4 | 0.4 | 0.4 | 0.4 | 0.4 | 0.4 |
| WATER | | BALANCE | BALANCE | BALANCE | BALANCE | BALANCE | BALANCE |
| CATIONIC RESIN PARTICLES/CROSS-LINKABLE RESIN PARTICLES | | 5 | 2.5 | 1.67 | — | — | — |
| EVALUATION | COLOR DEVELOPMENT PROPERTY | C | C | C | A | D | D |
| | CRY FRICTION FASTNESS | A | A | A | C | A | A |
| | WET FRICTION FASTNESS | A | A | A | C | A | A |
| | TEXTURE | B | B | B | A | B | C |
| | YELLOWING | A | A | A | A | A | B |

(Cationic Resin Particles)

Luster AB-8K (acrylic-based resin particles, average particle diameter: 80 to 120 nm, solid content: 11%, manufactured by Kotani Chemical Industry Co., Ltd.)

(Cross-Linkable Resin Particles)

PHOBOL EXTENDER XAN (2-butanonoxime block isocyanate resin, solid content: 10%, manufactured by Huntsman)

PHOBOL EXTENDER UXN (dimethylpyrazole block isocyanate resin, solid content: 10%, manufactured by Huntsman)

POLYURETHANE RESIN (trade name: Takelac WS6021, manufactured by Mitsui Chemicals, Inc.)

(Surfactant)

Olfine E1010 (trade name, nonionic-based surfactant, manufactured by Nisshin Chemical Industry Co., Ltd.)

2. Evaluation 2.1. Color Development Property printing was performed using each ink composition on a cloth (Print Star, heavy weight (white) 5.6 Oz) by a printer (SC-F200) manufactured by Seiko Epson Corporation at a resolution of 1,440 dpi×1,440 dpi and at a coating amount of 200 mg/inch$^2$. Subsequently, the treatment liquid composition was applied to an area to which the ink composition was adhered at a resolution of 1,440 dpi×1,440 dpi and at a coating amount of 200 mg/inch$^2$. In addition, by a conveyor oven (hot wind drying method), a heat treatment was performed at 165° C. of 5 minutes, so that a printed matter was fixed. An OD value of the printed matter of each example was measured by a colorimeter (trade name "Gretag Macbeth Spectrolino", manufactured by X-RITE), and based on the OD value thus obtained, the color development property was evaluated by the following evaluation criteria. When the evaluation result was C or higher, a preferable effect was regarded to be obtained.

Evaluation Criteria

A: OD value of 1.70 or more

B: OD value of 1.60 to less than 1.70

C: OD value of 1.50 to less than 1.60

D: OD value of less than 1.50

2.2. Friction Fastness Evaluation

A color fastness test was performed under dry friction conditions and wet friction conditions using an I type (crock meter) tester in accordance with the method defined in ISO-105 X12 on the printed matter obtained by the above evaluation of the color development property. In addition, based on the results thereof, the dry friction and the wet friction of the printed matter were evaluated by the following evaluation criteria. When the evaluation result was B or higher, a preferable effect was regarded to be obtained.

Evaluation Criteria: Dry Friction

A: 4 grade or higher

B: lower than 4 grade and 3-4 grade or higher

C: lower than 3-4 grade

Evaluation Criteria: Wet Friction

A: 3-4 grade or higher

B: lower than 3-4 grade and 3 grade or higher

C: lower than 3 grade 2.3. Texture

Based on direct palm touch feeling of a printed portion of the printed matter, which was obtained by the above evaluation of the color development property, the texture was evaluated by the following evaluation criteria. In addition, for the evaluation of the texture, the evaluation was performed by three persons, and an opinion supported by the largest number of persons was regarded as the evaluation result. In addition, when the opinions of the three persons are different from each other, an intermediate opinion thereof was regarded as the evaluation result.

Evaluation Criteria

A: Hardness and hand touch feeling of printed portion are almost similar to those of original cloth and are preferable.

B: Hardness or hand touch feeling of printed portion is slightly changed from that of original cloth but causes no problems in practical use.

C: Hardness or hand touch feeling of printed portion is degraded as compared to that of original cloth.

2.4. Yellowing

The printed matter obtained by the above evaluation of the color development property was observed and then evaluated by the following criteria. The evaluation was performed by three persons, and an opinion supported by the largest number of persons was regarded as the evaluation result. When the opinions of the three persons are different from each other, an intermediate opinion thereof was regarded as the evaluation result.

A: No yellowing is preferably observed.

B: Yellowing is slightly observed but causes no problems in practical use.

C: Yellowing is observed but is in acceptable range.

What is claimed is:

1. A treatment liquid composition which is applied to an area of a cloth in which a colorant-containing ink composition is printed, the treatment liquid composition comprising:

cationic acrylic-based resin particles; and resin particles having a cross-linkable group, wherein a content of the cationic acrylic-based resin particles with respect to a total mass of the treatment liquid composition is 0.01 to 1.0 percent by mass.

2. The treatment liquid composition according to claim 1, wherein the resin particles having a cross-linkable group have an isocyanate-based cross-linkable group, an oxazoline-based cross-linkable group, or a carbodiimide-based cross-linkable group.

3. The treatment liquid composition according to claim 2, wherein the resin particles having a cross-linkable group have an isocyanate-based cross-linkable group blocked by a dimethylpyrazole blocking agent.

4. The treatment liquid composition according to claim 1, wherein a content of the resin particles having a cross-linkable group with respect to a total mass of the treatment liquid composition is 0.01 to 0.50 percent by mass.

5. The treatment liquid composition according to claim 1, wherein the cationic acrylic-based resin particles have an average particle diameter of 50 to 300 nm.

6. The treatment liquid composition according to claim 1, wherein a content of the cationic acrylic-based resin particles to a content of the resin particles having a cross-linkable group is 1.0 to 30 in a mass ratio.

7. An ink set comprising:

the treatment liquid composition according to claim 1; and a colorant-containing ink composition.

8. The ink set according to claim 7, wherein the colorant-containing ink composition contains resin particles having a cross-linkable group, and the cross-linkable group of the resin particles contained in the colorant-containing ink composition and the cross-linkable group of the resin particles contained in the treatment liquid composition have properties so as to be cross-linked with each other.

* * * * *